United States Patent [19]

Radosz

[11] Patent Number: 5,264,536
[45] Date of Patent: Nov. 23, 1993

[54] SUPERCRITICAL MIXED-SOLVENT SEPARATION OF POLYMER MIXTURES

[75] Inventor: Maciej Radosz, Annandale, N.J.

[73] Assignee: Exxon Research and Engineering Company, Florham Park, N.J.

[21] Appl. No.: 892,462

[22] Filed: Jun. 2, 1992

Related U.S. Application Data

[63] Continuation of Ser. No. 623,008, Dec. 6, 1990, abandoned.

[51] Int. Cl.⁵ ............................................. C08F 6/04
[52] U.S. Cl. ................................... 528/483; 528/486; 528/495; 528/496; 528/497; 528/498
[58] Field of Search ............... 528/483, 486, 495, 496, 528/497, 498

[56] References Cited

U.S. PATENT DOCUMENTS 4,946,940  8/1990  Guckes et al. ...................... 528/483

OTHER PUBLICATIONS

Polymer Bulletin, vol. 12, No. 6, Dec., 1984, Heidelberg DE, pp. 491–497; I. Yilgor: 'Supercritical Fluids' *abstract*.

Primary Examiner—Joseph L. Schofer
Assistant Examiner—Tom Weber
Attorney, Agent, or Firm—Ronald D. Hantman

[57] ABSTRACT

A supercritical separation process is proposed for polymers, utilizing mixed solvents. Such a process can be used to remove light end, or heavy end, or generate bulk fractions of low polydispersity. Three modes of operation are proposed: increasing solvent capacity, decreasing solvent capacity, and single-vessel multistage separation.

8 Claims, 3 Drawing Sheets

SUPERCRITICAL MIXED-SOLVENT SEPARATION OF POLYMER MIXTURES

This is a continuation of application Ser. No. 623,008, filed Dec. 6, 1990 now abandoned.

BACKGROUND

Polymerization reactions usually lead to products of varying polydispersity, which means that such polymeric products contain a range of components, from low to high molecular weight. The quality of a final polymeric product (polymer for short) to a large extent depends on how broad its molecular weight distribution is. Usually, the broader the distribution, the lower the value. Hence, the common challenge in polymer manufacturing is to make the molecular weight distribution as narrow as possible. Since controlling the polymerization reaction conditions has only a limited effect on the molecular weight distribution, a separation process called fractionation is needed to narrow down the polymer weight distribution by separating either the light and/or heavy fractions from the bulk product, downstream of the polymerization reactor.

The fractionation approaches disclosed in the prior art (see U.S. Pat. No. 3,969,196; U.S. Pat. No. 3,294,772; U.S. Pat. No. 2,457,238; Krukonis, V. POLYMER NEWS, 11, 7-16, 1985; McHugh, M.A. and Krukonis, V.J. SUPERCRITICAL FLUID EXTRACTION: Principles and Practice, Butterworths, 1986, pages 143-180; Kumar, S.K. et al. FLUID PHASE EQUILIBRIA, 29, 373-382, 1986; Kumar, S.K. et al. MACROMOLECULES, 20, 2550-2557, 1987; McHugh, M.A. and Krukonis, V.J. in Encycl. Polym. Sci. Eng. 16, 368-399, 1989) are based on a general concept of using supercritical fluids as solvents, but none specifically discloses the use of mixed solvents for polymer fractionation. In the present invention, the solvent is a supercritical fluid containing at least two components, antisolvent and cosolvent. The key advantage of this invention is a higher degree of flexibility in selecting separation conditions and, hence, a better extraction efficiency.

SUMMARY OF THE INVENTION

The present invention is a process for fractionating a polydisperse polymer by molecular weight. The invention includes contacting the polymer with a solvent having at least two components (referred to as the "cosolvent" and "anti-solvent") wherein the components are chosen according to their selectivity and capacity for the polymer fractions at a given temperature and pressure to be separated. The process is operated at temperatures at which at least one of the components is above its critical temperature.

The solvent is a homogeneous solution before adding the polymer. Adding the polymer to the solvent converts the solvent solution to a two-phase mixture. One of the phases is polymer rich in polymer fraction of relatively high molecular weight (heavies). The other phase is both rich in solvent and polymer fractions of relatively low molecular weight (lights). That is, the solvent extracts the lights and rejects the heavies. After a period of time the heavies and lights each coalesce separately so that phases disengage. The polymer is separated from each phase by conventional means.

The temperature range is from 10 to 300° C., and the pressure range is from a few tens (20) to a few thousand bar (typically up to a few hundred bar, 500). Specific choices will depend on the polymer to be separated and solvent components.

The advantage of this process is the flexibility in selecting the operating conditions; not only temperature and pressure but also the solvent composition.

DESCRIPTION OF THE PREFERRED EMBODIMENT

Figure 1:
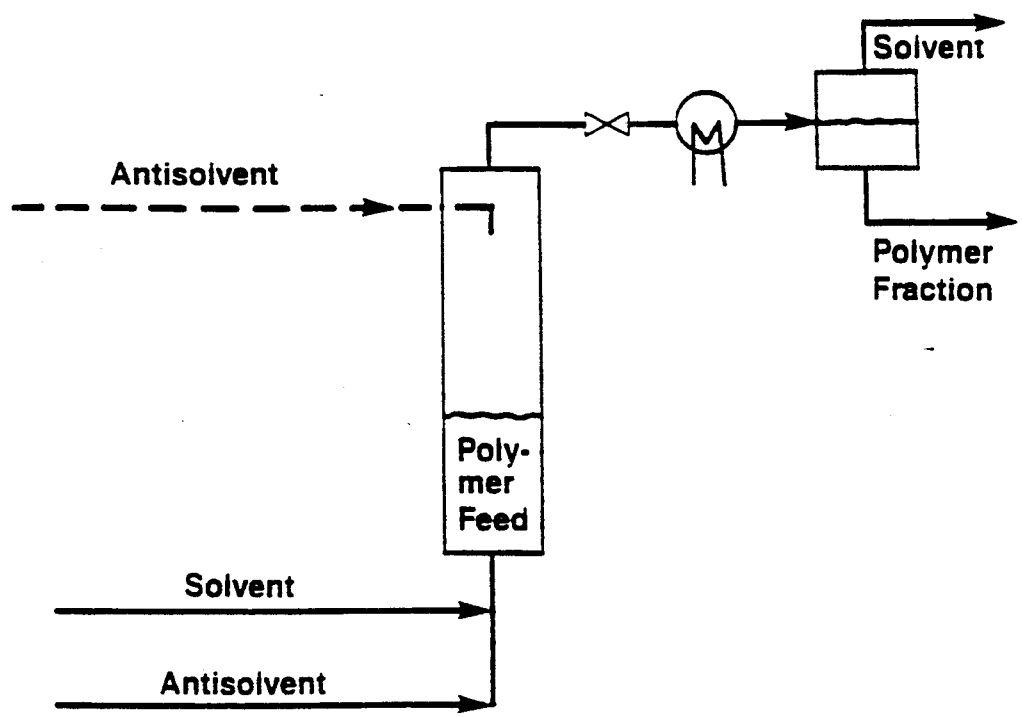
FIG. 1 shows a separation of increasing capacity mode, to remove the light-end fractions from the bulk polymer.

The present invention is a process for separating fractions by molecular weight of a polymer using a multi-component solvent. The preferred embodiment uses a mixed extraction solvent where at least one component has relatively low capacity (antisolvent) and at least one component has relatively high capacity (cosolvent). This way, in addition to pressure and temperature, the solvent composition can be used to control overall capacities, selectivities and yields. Hence, the present invention has the advantage of enhanced flexibility of fine tuning the operating variables to focus the separation on either the light end, or the heavy end, or the bulk fractions.

In the present invention, the following definitions are used. The solvent capacity is the amount of polymer which can be dissolved in solvent. The capacity is to be high during the extraction step because the higher the capacity the less solvent is needed to extract a given amount of polymer. However, the capacity should be low during the solvent recovery step. The solvent selectivity on the other hand is a measure of how sharp the separation is, and it varies from 1 (no separation) to infinity (perfect separation). For example, if two components are to be separated, the selectivity equal to 1 suggests that the solvent extract has exactly the same composition as the initial feed; the selectivity equal to a very high number suggests that the solvent extract contains only one component and rejects completely the other component. In practice, a selectivity of two to ten may be quite acceptable, a selectivity higher than ten is considered to be very good. In summary, for the extraction step, high capacity coupled with high selectivity is desired.

It is desirable to be able to vary and control capacity and selectivity, for example, to fine tune the separation, to generate reflux, or to recover the extract from solvent by drastically reducing its capacity. In this invention, this can be accomplished by varying the solvent composition because the antisolvent is a low-capacity component while the cosolvent is a high-capacity component.

Examples of antisolvents of the present invention include: Carbon dioxide, $C_1$-$C_3$ alkanes and alkenes, nitrous oxide, sulfur hexafluoride, noble gases (xenon, etc.), halogenated hydrocarbons.

Examples of antisolvents of the present invention include: $C_{3+}$ alkanes, alkenes, cyclics, alcohols, carboxylic acids, esters, ketones, amines, tetrahydrofurane, halogenated hydrocarbons (e.g., carbon tetrachloride, chloroform), formamide, dimethylformamide.

Solvent selection will depend on a temperature region required for a specific polymer. For example, typically, polymers will be fractionated above their glass-transition temperatures but below their thermal-decomposition temperatures. The solvent (mixture of antisolvent and cosolvent) should be selected in such a way that the fractionation temperature be supercritical or near-critical with respect to its critical temperature. This implies that the critical temperatures of mixed solvent candidates must be known approximately. For example, they can be estimated from the critical temperatures of the pure solvent components. The reason that the solvent should be supercritical or near-critical is that its supercritical and near-critical capacities (from zero to high) and selectivities (from one to high) can be easily varied over broad ranges, and hence allow for a great degree of flexibility. This is in contrast to subcritical capacities and selectivities.

A preliminary group of possible solvent candidates, selected based on their critical temperatures and pressures, can be further narrowed down on the basis of their specific capacity/selectivity characteristics, which have to be either measured (conventional techniques) or estimated from established thermodynamic models.

Polymers means mixtures containing compounds having similar chemical composition and structure but differing in molecular weight. Since molecular weight can continuously vary within a characteristic range for specific polymers, we say that polymers are POLYDISPERSE. For the present invention, a polymer is defined as a polydisperse mixture with molecular weight in the range between around 200 to a few hundred gram/mole.

In the preferred embodiment, the present invention includes polymers, solid or liquid, composed of free molecules, that is molecules that are not covalently bonded to each other, and hence free to be solubilized. The criteria will be solubilities in solvents (defined earlier): if the polymer molecules are free to move into the solvent phase, such a polymer is included in the present invention.

Specific examples of polymer classes suitable for the present invention include polyolefins, polydienes and polystyrenes.

Example 1 presents polymeric feed and extract compositions in terms of six arbitrarily chosen pseudocomponents having different average molecular weights. This is given for the feed and the extract. The focus of the separation in this case is on removing the light end components (500, 1k, and 2k components having an average MW of approximately 1.6k, in contrast to 18.5k for the bulk polymer). This example shows that the extract, obtained with the yield of 1.3 wt %, is rich in components 500, 1k, 2k, and contains a little of 3k but practically no 8k and 20k. This means that the main result of such a separation process is removal (extraction) of the very light components from the heavy bulk components.

EXAMPLE 1.

Example of Polymer Feed and Extract Compositions in Weight Fractions on a Solvent-Free Basis

|  | Feed | Extract (1.3 wt %) |
|---|---|---|
| 500 | .0007 | .0380 |
| 1k | .0093 | .4240 |
| 2k | .02 | .4093 |
| 3k | .02 | .1274 |
| 8k | .05 | .0003 |
| 20k | .90 | .0000 |
| $(MW)_{w'}$ | 18.5k | 1.6k |

Predicted at 200° C., 200 bar, 15 wt % polymer, 15 wt % $C_2$, 70 wt % $C_6$
polymer = polyolefin
$C_2$ = ethylene (antisolvent)
$C_6$ = 1-hexene (cosolvent)
500 = pseudocomponent having molecular weight of 500
1 k = pseudocomponent having molecular weight of 1 k = 1000, etc.
Extract yield = 1.3 wt %
$(MW)_w$ = weight average molecular weight In the next three examples, we will discuss the effects of antisolvent, pressure, and temperature on the solvent capacity and selectivity. In these examples, ethylene is antisolvent and hexene is cosolvent. Example 2 illustrates the antisolvent effect. For five different antisolvent concentrations ($C_2$ Wt % of 10, 15, 20, 30, 85), this example gives the distribution coefficients (K's, the ratios of weight percent in the extract phase to the raffinate phase), capacity, yield, and selectivities along the 2k/3k and 3k/8k lines. We focus on changes in capacity and selectivities; we observe that capacity decreases but selectivities increase upon increasing the antisolvent concentration. This will allow for a considerable degree of flexibility to control the separation (capacity and selectivity) by varying the antisolvent concentration. It is this effect that provides basis for the present invention.

EXAMPLE 2

Example of Antisolvent Effect on Separation: Solvent Capacity, Selectivity, and Extract Yield

| $C_2$ Wt % | 10 | 15 | 20 | 30 | 85 |
|---|---|---|---|---|---|
| K(500) | .827 | .791 | .732 | .545 | .16E − 1 |
| K(1k) | .449 | .395 | .323 | .158 | .58E − 4 |
| K(2k) | .132 | .987E − 1 | .627E − 1 | .134E − 1 | .79E − 9 |
| K(3k) | .388E − 1 | .246E − 1 | .122E − 1 | .113E − 2 | .1E − 13 |
| K(8k) | .855E − 4 | .238E − 4 | .338E − 5 | .483E − 8 | .5E − 38 |
| K(20k) | .36E − 10 | .14E − 11 | .98E − 14 | .63E − 21 | <.1E − 50 |
| Capacity Wt % | .29 | .25 | .20 | .10 | <.1E − 4 |
| Yield Wt % | 1.5 | 1.3 | 1.0 | .5 | <.1E − 2 |
| 2k/3k Selectivity | 3.4 | 4.0 | 5.1 | 11.9 | .8E + 5 |

-continued

| $C_2$ Wt % | 10 | 15 | 20 | 30 | 85 |
|---|---|---|---|---|---|
| 3k/8k Selectivity | 454 | 1034 | 3609 | .2E + 6 | .2 + 25 |

Capacity decreases, selectivity increases with increasing $C_2$ Wt %
Predicted at 200° C., 200 bar, 15 wt % polymer, 85 wt % $C_2 + C_6$
Polymer = *feed in Example 1*
$C_2$ = ethylene (antisolvent)
$C_6$ = 1-hexene (cosolvent)
K(500) = weight distribution coefficient of pseudo-component having molecular weight of 500
K(1k) = weight distribution coefficient of pseudo-component having molecular weight of 1k = 1000, etc.
Distribution coefficient = wt % in light phase / wt % in heavy phase
Capacity = solubility of polymer in light phase
Yield = yield of the extracted polymer
2k/3k Selectivity = K(2k)/K(3k), 'relative volatility' of 2k/3k
3k/8k Selectivity = K(3k)/K(8k), 'relative volatility' of 2k/3k Example 3 illustrates the pressure effect. For five different pressures (100, 200, 250, 300 bar), this example gives the distribution coefficients (K's, the ratios of weight percent in the extract phase to the raffinate phase), capacity, yield, and selectivities along the 2k/3k and 3k/8k lines. We focus on changes in capacity and selectivities; we observe that capacity increases but selectivities decrease upon increasing pressure. This example shows an additional degree of flexibility to control the separation (capacity and selectivity) by varying the process pressure.

EXAMPLE 3

Example of Pressure Effect

| Pressure Bar | 100 | 200 | 250 | 300 |
|---|---|---|---|---|
| K(500) | .514 | .791 | .836 | .861 |
| K(1k) | .134 | .395 | .465 | .511 |
| K(2k) | .904E − 2 | .987E − 1 | .144 | .180 |
| K(3k) | .612E − 3 | .246E − 1 | .445E − 1 | .636E − 1 |
| K(8k) | .871E − 9 | .238E − 4 | .126E − 3 | .347E − 3 |
| K(20k) | .81E − 23 | .14E − 11 | .97E − 10 | .128E − 8 |
| Capacity Wt % | .085 | .25 | .30 | .34 |
| Yield Wt % | 0.5 | 1.3 | 1.6 | 1.8 |
| 2k/3k Selectivity | 15 | 4.0 | 3.2 | 2.8 |
| 3k/8k Selectivity | .7E + 6 | 1033 | 353 | 183 |

Capacity increases, selectivity decreases with increasing $C_2$ Wt %
Predicted at 200° C., 15 wt % polymer, 15 wt % $C_2$, 70 wt % $C_6$
Polymer = *feed in Example 1*
$C_2$ = ethylene (antisolvent)
$C_6$ = 1-hexene (cosolvent)
K(500) = weight distribution coefficient of pseudo-component having molecular weight of 500
K(1k) = weight distribution coefficient of pseudo-component having molecular weight of 1k = 1000, etc.
Distribution coefficient = wt % in light phase / wt % in heavy phase
Capacity = solubility of polymer in light phase
Yield = yield of the extracted polymer
2k/3k Selectivity = K(2k)/K(3k), 'relative volatility' of 2k/3k
3k/8k Selectivity = K(3k)/K(8k), 'relative volatility' of 2k/3k Example 4 illustrates the temperature effect. For two different temperatures (200° C. and 220° C.), at two different pressures, this example gives the distribution coefficients (K's, the ratios of weight percent in the extract phase to the raffinate phase), capacity, yield, and selectivities along the 2k/3k and 3k/8k lines. We focus on changes in capacity and selectivities; we observe that capacity decreases but selectivities increase upon increasing temperature at low pressures (100 and 200 bar). However, the opposite is true at higher pressures (250 and 300 bar); capacity increases but selectivities decrease upon increasing temperature. This example shows that the temperature effect is the most difficult to predict, and will depend on the pressure range for a specific antisolvent/cosolvent pair.

EXAMPLE 4

Example of Temperature Effect

| Pressure Bar | 100 | 200 | 250 | 300 |
|---|---|---|---|---|
| Temperature °C. | 200 | 220 | 200 | 220 |
| K(500) | .514 | .471 | .791 | .834 |
| K(1k) | .134 | .104 | .395 | .431 |
| K(2k) | .904E − 2 | .503E − 2 | .987E − 1 | .115 |
| K(3k) | .612E − 3 | .244E − 3 | .246E − 1 | .308E − 1 |
| K(8k) | .871E − 9 | .65E − 10 | .238E − 4 | .422E − 4 |
| K(20k) | .81E − 23 | .11E − 25 | .14E − 11 | .56E − 11 |
| Capacity Wt % | .085 | .069 | .25 | .27 |
| Yield Wt % | 0.5 | .37 | 1.3 | 1.4 |
| 2k/3k Selectivity | 15 | 21 | 4.0 | 3.7 |
| 3k/8k Selectivity | .7E + 6 | .4E + 7 | 1033 | 730 |

Capacity increases with decreasing temperature at low pressures
Capacity decreases with decreasing temperature at high pressures
Predicted for 15 wt % polymer, 15 wt % $C_2$, 70 wt % $C_6$
Polymer = *feed in Example 1*
$C_2$ = ethylene (antisolvent)
$C_6$ = 1-hexene (cosolvent)
K(500) = weight distribution coefficient of pseudo-component having molecular weight of 500
K(1k) = weight distribution coefficient of pseudo-component having molecular weight of 1k = 1000, etc.
Distribution coefficient = wt % in light phase / wt % in heavy phase
Capacity = solubility of polymer in light phase
Yield = yield of the extracted polymer
2k/3k Selectivity = K(2k)/K(3k), 'relative volatility' of 2k/3k
3k/8k Selectivity = K(3k)/K(8k), 'relative volatility' of 2k/3k All these examples are related to a fractionation where the light extract phase is light-end-rich while the heavy phase is bulk-polymer-rich. One application of the present invention is shown in FIG. 1. The objective is to remove light-end fractions of progressively increasing molecular weight. In this application, a batch of polymer is treated with a solvent of a gradually increasing capacity. This can be accomplished, for example, by gradually increasing pressure, increasing/decreasing temperature, or gradually increasing the cosolvent-to-antisolvent ratio.

Figure 2:
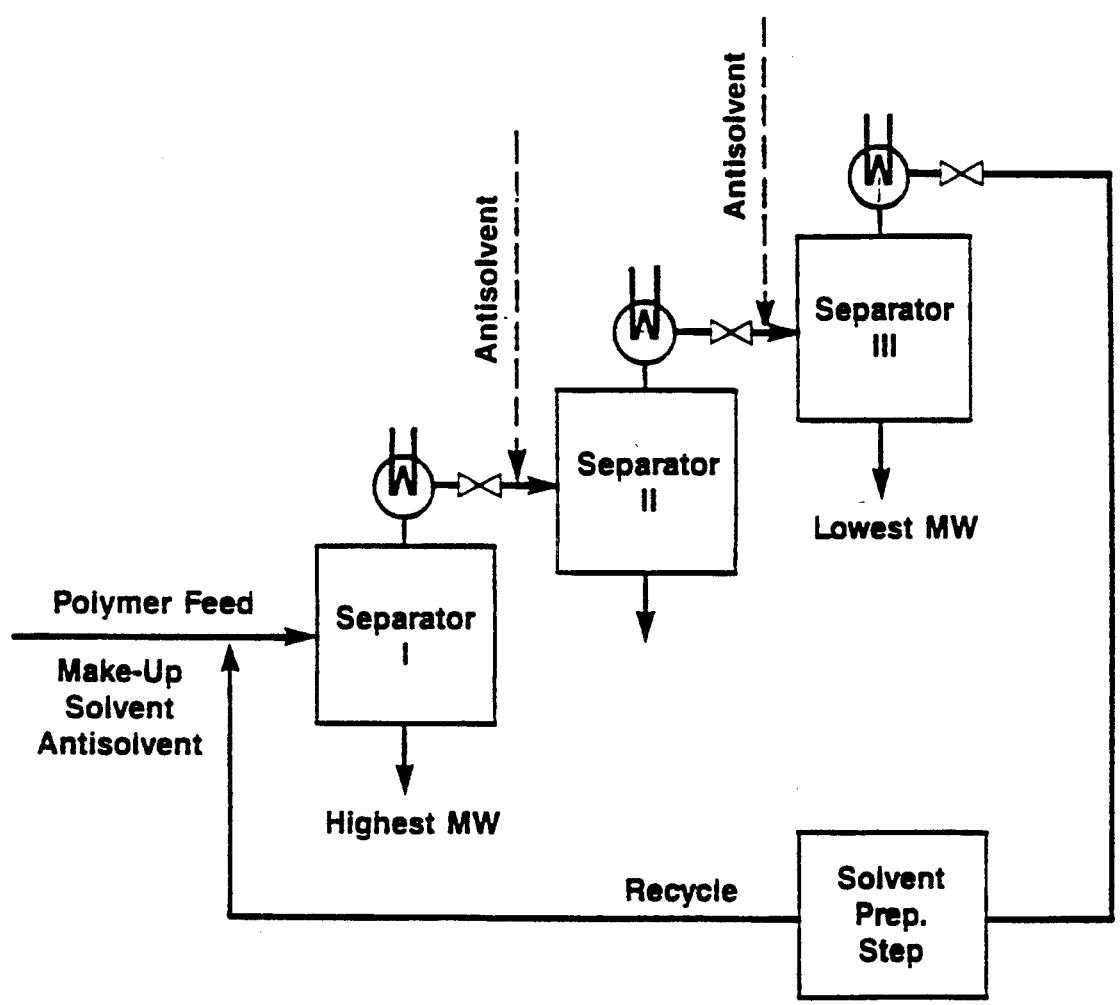
FIG. 2 shows a multiple-vessel separation of decreasing capacity mode, to remove the heavy-end fractions from the bulk polymer.

An alternative application, utilizing a decreasing capacity mode, is illustrated with an example shown in FIG. 2. Upstream of the separator I, the polymer is mixed with the solvent to form one phase. Next, the solvent capacity is gradually decreased to precipitate fractions of progressively decreasing molecular weight in the successive stages. This can be accomplished, for example, by gradually decreasing pressure, decreasing/increasing temperature, or gradually decreasing the cosolvent-to-antisolvent ratio. This ratio can be varied either within the main solvent stream or, better, by adding the antisolvent at the top of the vessel (e.g., column) to generate reflux. For a single-stage separator, the objective will be to remove the very heavy end from the bulk polymer. For a multistage separation, the light phase in the last stage will become light-end-rich. Usually, this mode of operation requires complete, or almost complete, solubility of the bulk polymer at the maximum capacity conditions upstream of separator I.

Figure 3:
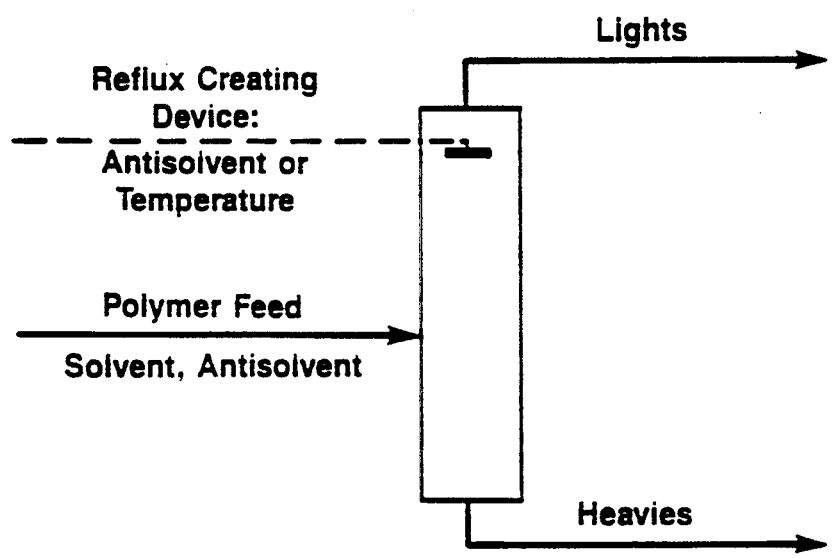
FIG. 3 shows a single-vessel multistage separation, to fractionate the bulk polymer in a continuous process.

Finally, a single-vessel multistage separation is proposed and illustrated with an example in FIG. 3. Here, a desirable concentration gradient along the column is created by a reflux forming device at the top of the column (although reflux can also be formed outside of the column and recycled). Such a device will reduce the solvent capacity by either local addition of antisolvent or local temperature swing (usually decrease). In this example, FIG. 3, both solvent and polymer feed flow continuously through the column. The overhead product stream is rich in lights whereas the bottoms product stream is rich in heavies.

In all the application examples solvent can be recovered by conventional means, which usually involve a step reduction of its capacity, for example a combination of temperature and pressure swing that will result in polymer precipitation (phase separation from the solvent), and recycled. Such a recovery of a light component from a heavy component is a conventional chemical engineering operation.

The present invention can have numerous process applications. For example, high-pressure manufactured polyolefins can be fractionated with the mixed solvents composed of monomers and co-monomers. Also, specialty polymeric materials, where low polydispersity is required, can be made this way. Selection of specific solvent components is dependent on their critical points, selectivity and capacity.

The present invention is uniquely suited for fractionating high-molecular weight mixtures, such as, polymers. Compared to molecular distillation, temperatures are quite low and hence thermally sensitive materials can be treated. Compared to liquid solvent fractionation, solvent recovery is more efficient, residual solvent levels are much lower, selectivities with respect to MW are much higher, but selectivities with respect to chemical functionalities can be lower (this can be refined with specifically interacting solvent modifiers). Compared to liquid chromatography, continuous operation and scale-up are possible and operating costs are expected to be much lower.

What is claimed is:

1. A process for separating a polydisperse polymer into fractions according to molecular weight comprising:
   (a) contacting said polymer with a solvent having at least two components (an antisolvent and a cosolvent), wherein said components are chosen according to their selectivity and capacity for the polymer fractions at a given temperature and pressure to be separated, said process operated at a temperature at which at least one of said components is above its critical temperature, such that the polymer and solvent mixture separates into phases wherein each phase is rich in a different polymer fraction, wherein said components, said temperature, and said pressure are chosen so as to determine a different average molecular weight for each fraction;
   (b) separating each phase which contains a different polymer fraction from each other, wherein each polymer fraction is greater than 1 wt % of said polymer; and
   (c) separating at least one of said polymer fractions from said solvent.

2. The process of claim 1 wherein said temperature is between 10 and 300° C.

3. The process of claim 1 wherein said pressure is between 20 and 3000 bar.

4. The process of claim 1 wherein said polymer is a main-chain acyclic carbon polymer.

5. The process of claim 4 wherein said main-chain acyclic carbon polymer is selected from the group consisting of polyolefins, polydienes, poly(styrenes), and random alternating, block and graft copolymers thereof, and mixtures thereof.

6. The process of claim 1 wherein said antisolvent is selected from the group consisting of carbon dioxide, $C_1$–$C_3$ alkanes and alkenes, nitrous oxide, sulfur hexafluoride, noble gases (xenon, etc.), and halogenated hydrocarbons.

7. The process of claim 1 wherein said cosolvent is selected from the group consisting of $C_{3+}$ alkanes, alkenes, cyclics, alcohols, carboxylic acids, amines, esters, ketones, tetrahydrofurane, halogenated hydrocarbons (e.g., carbon tetrachloride, chloroform), formamide, and dimethylformamide.

8. The process of claim 1 further comprising the step after step (b) of separating one of said phases into two additional phases, each of which contains a different polymer fraction from each other.

* * * * *